United States Patent [19]

Barnes

[11] 4,024,018
[45] May 17, 1977

[54] LIQUID METAL COOLED FAST BREEDER NUCLEAR REACTORS

[75] Inventor: Sidney Barnes, Warrington, England

[73] Assignee: United Kingdom Atomic Energy Authority, London, England

[22] Filed: Nov. 25, 1974

[21] Appl. No.: 526,823

[30] Foreign Application Priority Data

Dec. 6, 1973 United Kingdom ............ 56703/73

[52] U.S. Cl. .................................. 176/30; 176/38; 176/40; 176/87
[51] Int. Cl.² .......................................... G21C 19/00
[58] Field of Search ................. 176/15, 17, 18, 30, 176/31, 32, 36 S, 40, 87, 38; 214/18 N

[56] References Cited

UNITED STATES PATENTS

| | | | |
|---|---|---|---|
| 3,144,918 | 8/1964 | Picton et al. ......................... | 176/38 |
| 3,153,619 | 10/1964 | Ericsson et al. ...................... | 176/30 |
| 3,212,979 | 10/1965 | Silverblatt ......................... | 176/36 S |
| 3,305,452 | 2/1967 | Remoleur ............................ | 176/38 |
| 3,321,370 | 5/1967 | Oppenheimer ....................... | 176/30 |
| 3,354,040 | 11/1967 | Frame et al. ......................... | 176/29 |
| 3,488,253 | 1/1970 | Yevick et al. ........................ | 176/63 |
| 3,562,109 | 2/1971 | Bezold et al. ....................... | 176/36 S |
| 3,853,703 | 12/1974 | Anthony et al. ...................... | 176/87 |
| 3,855,066 | 12/1974 | Deitrich et al. .................... | 176/36 S |

Primary Examiner—Samuel W. Engle
Assistant Examiner—S. A. Cangialosi
Attorney, Agent, or Firm—Larson, Taylor and Hinds

[57] ABSTRACT

In a liquid metal cooled fast breeder nuclear reactor of the pool kind a fuel transfer rotor submerged in the pool of coolant carries an annular series of thimble shaped containers for receiving fuel assemblies. The containers are elastically supported in the rotor and a hydraulic dash pot is provided to absorb the energy of a falling fuel assembly.

4 Claims, 3 Drawing Figures

LIQUID METAL COOLED FAST BREEDER NUCLEAR REACTORS

BACKGROUND OF THE INVENTION

This invention relates to liquid metal cooled fast breeder nuclear reactors of the pool kind.

In a nuclear reactor of the pool kind the reactor core and ancillary components, such as heat exchangers and coolant circulating pumps, are immersed in a pool of coolant.

One known construction of liquid metal cooled fast breeder nuclear reactor of the pool kind comprises a primary vessel suspended from the cover of a concrete vault and containing a pool of liquid sodium. The reactor core, coolant pumps and heat exchangers are also suspended from the cover of the concrete vault and are immersed in the pool of sodium. Ducting is provided whereby coolant from the pool can be pumped successively through the core and the heat exchangers thence back to the pool. Replacement of spent fuel is carried out whilst the reactor is shut down and the irradiated fuel assemblies are withdrawn from the core by a charge machine located above the cover of the concrete vault. Whilst still submerged in liquid sodium the irradiated fuel is transferred sideways and lowered into a transfer rotor. Subsequently the irradiated fuel is removed from the vault to storage racks. The transfer rotor has provision for the temporary storage of twenty irradiated fuel assemblies, each within a stainless steel bucket. For insertion and withdrawal of a fuel assembly the rotor is rotated to bring an assembly to a loading or discharging station. An irradiated fuel assembly is withdrawn from the rotor within its bucket and the combination of fuel assembly, bucket and sodium (weighing approximately 100 kilograms) is lifted approximately 27 meters. Thus in the event of malfunction the combination falls back into the rotor with considerable energy. To prevent damage to the rotor an arrangement of fracture pins limits the transfer of energy to the rotor and deformable energy absorbing devices prevent damage to the reactor vessel and other parts of the reactor structure. After such a malfunction it is necessary to replace the fractured pins and the deformed energy absorbing device by remote means operated over a considerable distance from outside the vault and the operation is, therefore, very complex. It is an object of the present invention to provide a liquid metal cooled fast breeder reactor of the pool kind having improved energy absorbing means for fuel assemblies falling into a fuel transfer rotor.

SUMMARY OF THE INVENTION

According to the invention in a liquid metal cooled fast breeder nuclear reactor of the pool kind having a transfer rotor for the temporary storage of irradiated fuel assemblies in the pool of reactor coolant whilst the fuel assemblies are in transit from the reactor core to storage means, the fuel assemblies are supported in the transfer rotor by elastic means and there is provided a hydraulic dash pot at least in one position below the transfer rotor for absorbing the energy of a falling fuel assembly.

By hydraulic dash pot is meant a construction including a piston movable within a cylinder to displace fluid within the cylinder through a restricted passage whereby the kinetic energy of the falling load is absorbed by the displacement of fluid.

In a preferred construction of liquid metal cooled fast breeder reactor dash pots are provided immediately below a receiving station for irradiated fuel assemblies in the transfer rotor and immediately below a discharge station for fuel assemblies, and the transfer rotor has buckets each for housing a fuel assembly, each bucket being carried in a container which is elastically supported in the transfer rotor on a helical coil compression spring so that, in the event of a malfunction of the hereinbefore described kind, the container and bucket are returned to their normal operating position after the kinetic energy of the falling load has been absorbed by the dash pot. The transfer rotor may also be provided with recoil springs for absorbing the recoil energy of the helical coil springs.

The invention embodied in the preferred construction provides that the energy of a falling fuel assembly, bucket and coolant combination is absorbed by displacement of coolant in the dash pot and for the subsequent return of the combination to its normal storage position in the transfer rotor without causing damage to the reactor construction. Thus, when the cause of the malfunction has been ascertained and corrective action has been taken, normal discharge operations can be resumed without the need for complex repairs and replacements to be made to ancillary equipment of the transfer rotor.

The lower end of each container may be adapted to form a piston for the dash pot or dash pots, the cylinder being located in a static base supporting the rotor but, preferably, the complete dash pot is located in the base and presents a striker platform to the lower end of a descending container. This latter preferred feature avoids the need for very accurate positioning of the rotor whereby the lower end of a descending container forming a piston is enabled to enter the cylinder.

DESCRIPTION OF THE DRAWINGS

Constructional embodiments of the invention will now be described, by way of example, with reference to the accompanying drawings wherein.

DESCRIPTION OF THE PREFERRED EMBODIMENTS

Figure 1:
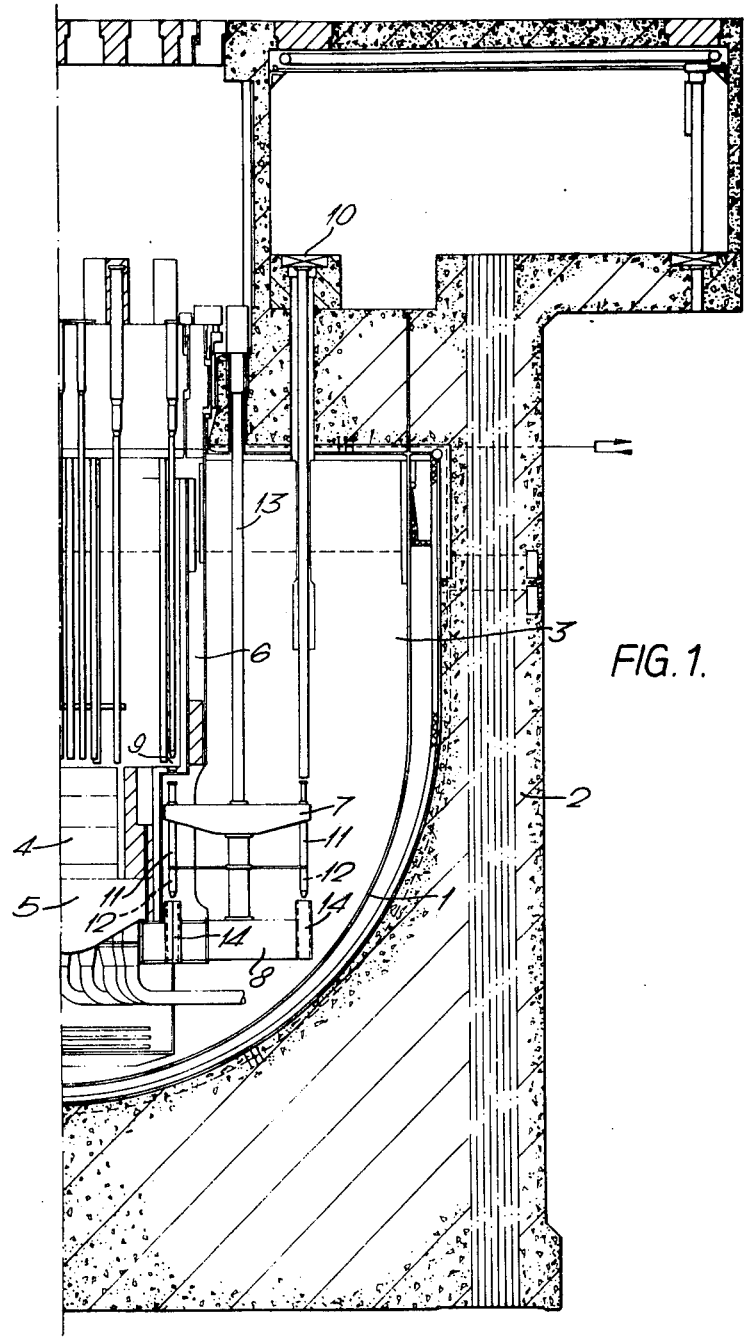
FIG. 1 shows in half section a typical liquid metal cooled fast breeder reactor of the pool kind having a fuel assembly transfer rotor.

In the construction of liquid metal cooled fast breeder reactor of the pool kind shown in FIG. 1 there is shown a primary vessel 1 suspended from the cover of a concrete vault 2 and containing a pool 3 of liquid sodium. The reactor core 4 is suspended on a diagrid 5 from the cover of the concrete vault. The sodium coolant pumps and heat exchangers of the construction are not shown in the drawing but they also are suspended from the cover of the concrete vault 2 and immersed in the pool 3 of liquid sodium. A core tank 6 surrounds the reactor core and alongside the core tank there is a fuel transfer rotor 7 rotatably supported from the cover of the vault 2. A transfer port 9 in the core tank provides passage for irradiated fuel assemblies from the core to the transfer rotor 7 and there is a discharge port 10 in the cover of the concrete vault 2 for the withdrawal of fuel assemblies. The rotor carries equally circumferentially spaced stainless steel containers 11 and a charge machine (not shown) disposed above the cover of the concrete vault 2 is used to lift spent fuel assemblies from the core 4 and transfer them to individual buckets 12 in the containers 11. The transfer rotor is rotated by a shaft 13 from above the cover of the concrete vault in step-wise manner to present successive buckets to the transfer port 9 and to present them in step-wise manner to the discharge port 10. Energy absorbers 14 are shown diagrammatically and are provided in a base 8 directly beneath the transfer port 9 and the discharge port 10 for fuel assemblies.

Figure 2:
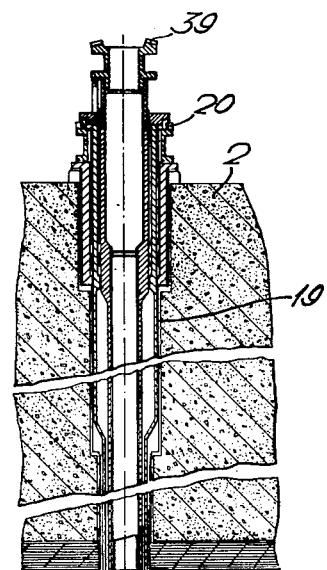
FIG. 2 is a fragmentary section drawn to a larger scale than FIG. 1 showing one example of a transfer rotor in a nuclear reactor construction according to the invention.
Figure 2:
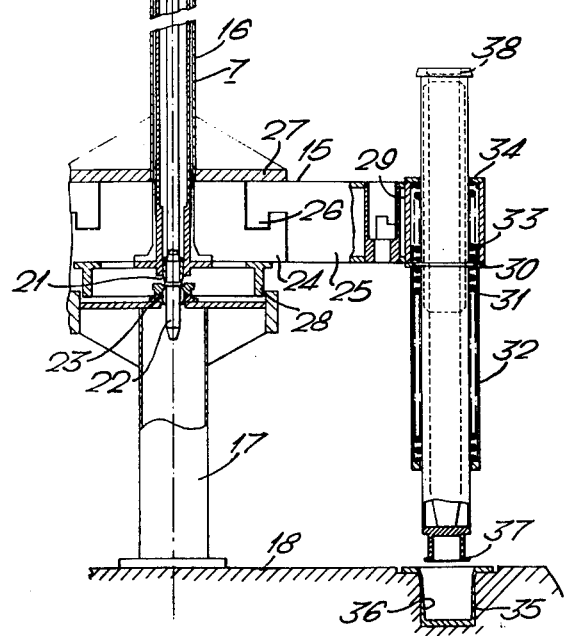

A transfer rotor 7 is shown in greater detail in FIG. 2 and comprises a horizontally disposed receiver 15 mounted on a vertical composite shaft 16. The receiver and shaft assembly is steadied by a tubular pedestal 17 mounted on a base 18. The shaft extends through an opening 19 in the cover of the concrete vault 3 where it is end supported in a bearing 20; the lower end is guided by a bush 21 and complementary stub shaft 22 which is located on the pedestal in a spherical mounting 23. Step wise rotation of the rotor 7 is effected by drive means (not shown) through a gear wheel 39 at the upper end of the shaft 16. The receiver 15 comprises a central boss 24 secured to the composite shaft 16 and having twenty arms 25 extending radially outwards from it. The arms 25 engage the boss 24 by hook connections 26 and are retained in engagement by two clamping plates 27, 28. The free ends of the arms 25 each have an aperture 29 housing a vertical open top container 11. The container of each arm 25 has a circumferential flange 30 and is supported on a helical coil compression spring 31 housed within a sleeve 32 depending from the lower face of the arm. A second helical coil compression spring 33 about the container 11 and housed within the aperture 29 abuts, at one end, the upper face of the flange 30 and, at the other end, an abuttment flange 34 of the arm. The base 18 carries two dash pot cylinders 35 having bores 36 which converge towards the lower closed end of the cylinders, there being one cylinder disposed in positions immediately below each of the transfer port 9 and discharge port 10. The lower end of each container 11 forms a piston 37 complementary to the dash pot cylinders 35. The containers each house a bucket 12 for receiving fuel assemblies from the reactor core and which have a lip 38 for engagement by lifting means which can withdraw the bucket complete with fuel assembly and sodium through the cover of the concrete vault 2.

In the event of a malfunction whereby a fuel assembly is released in passage through the transfer port 9 or a bucket-fuel assembly-sodium combination is released on passage through the discharge port 10, the load falls into a container 11 disposed above an energy absorbing device. The container is driven downwardly compressing the spring 31 and energy is dissipated in the form of heat by displacement of sodium from the cylinder 35 through the diminishing limited clearance between the piston 37 and the wall of the cylinder 35. When the container and load have been brought to rest by the dash pot, the helical coil spring 31 returns the container and load to the normal operating position in the rotor, recoil vibrations being damped by the two opposed springs 31, 33. The construction has the advantage that sacrificial components such as deformable shock absorbers are eliminated.

Figure 3:
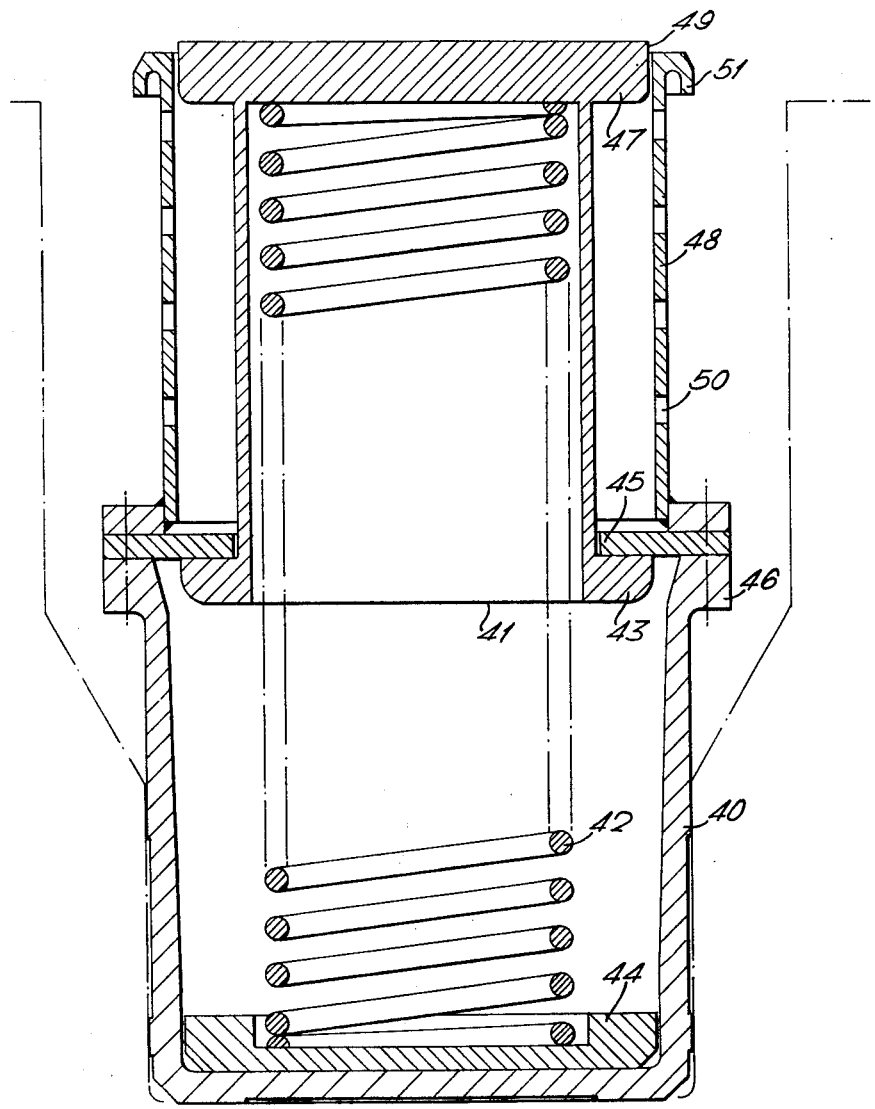
FIG. 3 shows in cross-section, drawn to a larger scale than FIG. 2 an alternative form of dashpot.

In an alternative construction the cylinders and pistons of the dash pots form unitary combinations which are located in the base. Each dash pot unit presents a plane striker platform to the lower end of the descending container. A dash pot unit is shown in FIG. 3 and comprises a cylinder 40, having a closed end, and a piston 41 which are normally urged to a vertically extended condition by a helical coil compression spring 42.

The piston comprises an inverted cup having a circular flange 43 and the extent of travel of the piston in the cylinder is limited by a pad 44 in the base of the cylinder and four equally spaced lugs 45 extending radially inwards from a flange 46. The piston has a flange at the upper end which presents a striker platform 47 to containers 11 and is guided during downward travel by a coaxial tubular extension 48 of the cylinder. The striker platform 47 is generally circular but has four sectors cut away to present four equally spaced arcuate bearing surfaces 49 for guiding the piston within the extension. The bore of the cylinder converges towards the closed lower end so that a peripheral clearance between the piston or cylinder diminishes as the piston travels downwardly towards the lower end. The extension has apertures 50 in the wall for the discharge of sodium and a lip 51 for engagement by a lifting grab. When the piston is driven downwardly by a container, liquid sodium is ejected from the cylinder by way of the clearance between the piston and cylinder, thence through the apertures 50 and the segmented passages bounded by the striker platform 47 and the extension 48. When a dash pot as shown in FIG. 3 is used instead of that shown in FIG. 2, misalignment tolerances of the rotor relative to the dash pot can be greatly relaxed.

I claim:
1. A liquid metal cooled fast breeder nuclear reactor comprising:
   a primary vessel containing a pool of coolant,
   a reactor core submerged in the pool of coolant,
   a transfer rotor submerged in the pool of coolant alongside the reactor core, the transfer rotor being rotatable about a vertical axis and having an annular series of apertures disposed about said axis,
   a plurality of elongate thimble shape containers for receiving fuel assemblies disposed one in each of said apertures,
   a plurality of helical coil compression springs mounted on and carried by said rotor each spring operatively engaging and elastically supporting one of said containers in upright position in its aperture, and
   at least one hydraulic dash pot located directly below the path of the containers arranged so that, by rotation of the rotor, the containers are successively brought into register with the dash pot, the construction and arrangement being such that the momentum of a falling fuel element is transferred to the container and then to the dashpot, and after arrest of the container and fuel element they are returned to normal operating position of the container by the associated compression spring.

2. A liquid metal cooled fast breeder nuclear reactor according to claim 1 having a second helical coil compression spring in each aperture of the rotor, the second helical coil compression spring being reactively opposed to the first helical coil compression spring and the container being elastically suspended between the springs.

3. A liquid metal cooled fast breeder reactor according to claim 2 wherein the dash pot comprises a piston within a static cylinder, the piston having a horizontal plane surface arranged for impact with a descending container.

4. A liquid metal cooled fast breeder nuclear reactor according to claim 2, wherein the hydraulic dash pot comprises a static cylinder arranged for receiving the lower end of a descending container, the lower end of each container being adapted to form a piston for the dash pot.

* * * * *